(12) United States Patent
Batten et al.

(10) Patent No.: US 7,186,346 B1
(45) Date of Patent: Mar. 6, 2007

(54) LOW COST INDOOR GREASE TRAP

(75) Inventors: William C. Batten, Asheboro, NC (US); Charles Kemp, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 322 days.

(21) Appl. No.: 10/766,128

(22) Filed: Jan. 28, 2004

(51) Int. Cl.
   *B01D 17/025* (2006.01)
(52) U.S. Cl. .................. 210/776; 210/801; 210/523; 210/540
(58) Field of Classification Search .......... 210/776, 210/800, 801, 523, 532.1, 538, 540
   See application file for complete search history.

(56) References Cited

U.S. PATENT DOCUMENTS

| | | | |
|---|---|---|---|
| 530,684 A | 12/1894 | Gibbons | |
| 748,981 A * | 1/1904 | Oliver | 210/540 |
| 773,362 A | 10/1904 | Anderson | |
| 911,314 A * | 2/1909 | Maranville | 210/540 |
| 1,147,881 A * | 7/1915 | Morris | 210/540 |
| 1,159,044 A | 11/1915 | Kelly, Jr. | |
| 1,164,527 A | 12/1915 | Kelly, Jr. | |
| 1,200,951 A | 10/1916 | Kelly, Jr. | |
| 1,612,557 A * | 12/1926 | Weisgerber | 210/540 |
| 2,284,737 A * | 6/1942 | Hirshstein | 210/540 |
| 2,782,929 A * | 2/1957 | Colket | 210/532.1 |
| 3,365,060 A | 1/1968 | Hsu | 210/84 |
| 3,426,902 A | 2/1969 | Kilpert et al. | 210/179 |
| 4,123,365 A * | 10/1978 | Middelbeek | 210/540 |
| 4,208,291 A | 6/1980 | Ochoa | 210/523 |
| 4,235,726 A | 11/1980 | Skimko | 210/523 |
| 4,268,396 A | 5/1981 | Lowe | 210/670 |
| 4,400,274 A | 8/1983 | Protos | 210/302 |
| 4,651,762 A | 3/1987 | Bowden | 134/111 |
| 5,132,010 A * | 7/1992 | Ossenkop | 210/540 |
| 5,133,881 A | 7/1992 | Miller et al. | 210/776 |
| 5,167,815 A | 12/1992 | Bachmann et al. | 210/242.3 |
| 5,225,085 A | 7/1993 | Napier et al. | 210/705 |
| 5,344,566 A | 9/1994 | Clancey | 210/638 |
| 5,360,555 A | 11/1994 | Batten | 210/803 |
| 5,522,990 A | 6/1996 | Davidian | 210/242.3 |
| 5,746,911 A * | 5/1998 | Pank | 210/538 |
| 5,993,646 A | 11/1999 | Powers | 210/86 |
| 6,056,128 A | 5/2000 | Glasgow | 210/521 |
| 6,079,571 A | 6/2000 | Stowell | 210/521 |
| 6,517,715 B1 * | 2/2003 | Batten et al. | 210/538 |

(Continued)

FOREIGN PATENT DOCUMENTS

DE        3215896        11/1983

(Continued)

*Primary Examiner*—Christopher Upton
(74) *Attorney, Agent, or Firm*—MacCord Mason PLLC

(57) ABSTRACT

An oil/grease removal assembly includes a container having an inlet to receive effluent from a kitchen sink. A drain connection spaced above the container bottom defines a static water level for contained liquid and connects to a sewer. A baffle extends downwardly below the static water level so water can flow below the baffle to the drain, while retaining floating oil/grease. Means intermittently raise the liquid level in the container above the static water level. Floating oil/grease can flow out through a port when the liquid level in the container is raised above the static water level.

19 Claims, 3 Drawing Sheets

U.S. PATENT DOCUMENTS 6,824,696 B1* 11/2004 Tolmie et al. .............. 210/801
2002/0003104 A1* 1/2002 Evanovich et al. ......... 210/153
2003/0121846 A1* 7/2003 Use et al. ................ 210/532.1

FOREIGN PATENT DOCUMENTS

| GB | 10958 | 11/1914 |
|----|-------|---------|
| JP | 48 30826 | 9/1973 |
| JP | 60 12022 | 6/1985 |
| NL | 8502049 | 7/1985 |
| SU | 1269809 | 10/1983 |

* cited by examiner

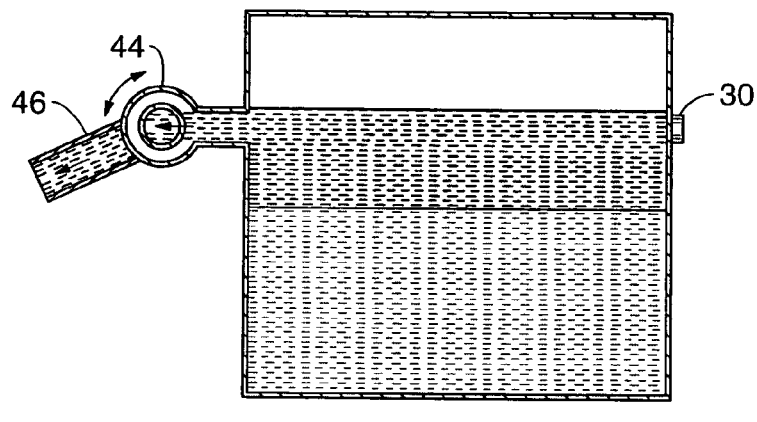
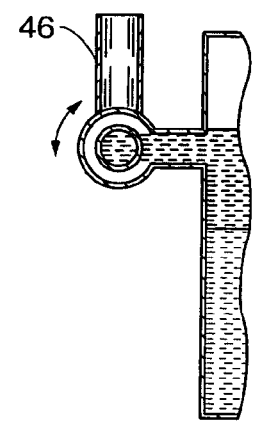
Fig. 3
Fig. 4
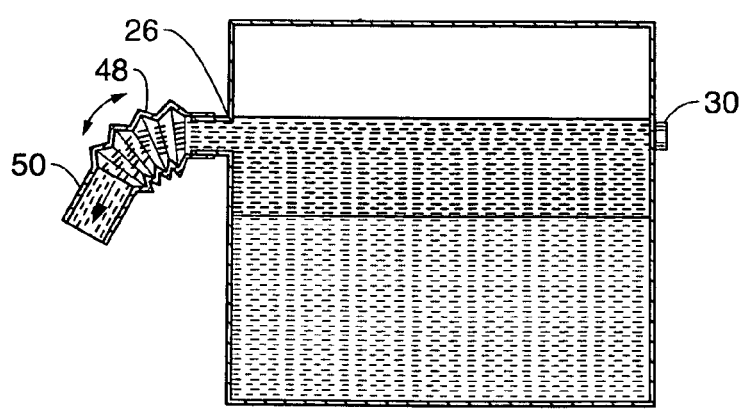
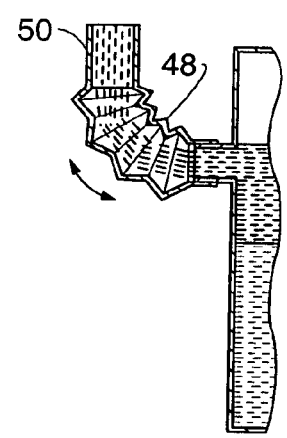
Fig. 5
Fig. 6

LOW COST INDOOR GREASE TRAP

BACKGROUND OF THE INVENTION

This invention relates to a low cost assembly for the removal and recovery of fat, oil and/or grease (hereinafter referred to as oil/grease) found in effluent discharge of restaurants, food processing, or like facilities, or other circumstances involving mixtures of oil/grease to be recovered or removed.

Oil/grease removal or recovery systems are well known. Sewer system lines can become clogged from the oil/grease waste materials put into the sewer system from food handling facilities. This has led more and more sewer authorities to implement fats, oils and grease control programs. These programs regulate food handling facilities and the manner in which they process oil/grease. The object of many of these programs is to ensure that food handling facilities remove as much of the oil/grease as possible from the effluent flow, thereby releasing only grey water, perhaps with solids, to the sewer system.

One method recognized in the prior art of accomplishing such removal is the use of a container including one or more rotating disks formed of a plastic or like material to which oil/grease contaminants are attracted. Typically, the rotation of the disk is in an at least partially immersed condition, which allows the oil to cling to one or both sides of the disk so that contaminants are removed from the body of water upon rotation of the disk. Scrapers are typically used to remove the oil contaminants from the opposite sides of the disk and channel such contaminants to a collection or disposal storage unit.

U.S. Pat. No. 5,133,881 to Miller et al. is representative of such oil/grease removal systems containing one or more rotating disks. The Miller et al. patent discloses an oil or grease removal assembly which removes such contaminants from the surface of the body of water and includes a rotatable disk made of plastic or other material to which such oil contaminants have an affinity, so they adhere to the disk. The disk is disposed in cooperative relation to an elongated trough having scraper blades for engaging the opposite sides of the disk for the removal of the oil contaminants therefrom with the trough disposed and structured to direct such oil contaminants away from the disk and the body of water via the trough to a storage container. The disclosure of the Miller patent, assigned to Thermaco, Inc. in Asheboro, N.C., is hereby incorporated herein by reference.

The existing devices may be difficult to service and are very often permanently installed at facility sites. Because many of the parts are coated with oil/grease, servicing can be messy and time consuming. In addition, these systems tend to be expensive and represent a significant capital investment. Accordingly, there is a need in the art for an method and apparatus for separation of oil/grease from wastewater which is simple in design, low in cost and capable of being serviced easily in the field because of the availability of low cost replaceable parts which are easily installed and do not require extensive and costly repair.

SUMMARY OF THE INVENTION

The present invention fulfills one or more of these needs in the art by providing an oil/grease removal assembly including a container having a bottom, a top, a sidewall, an input end and discharge end. An inlet at the input end is adapted to receive effluent from a sink drain, and a drain connection at the discharge end spaced above the bottom and below the top defines a static water level for liquid in the container. A baffle in the container extends downwardly near the discharge end to a level below the static water level to allow water to flow below the baffle from the inlet to the drain connection but retaining oil/grease floating on the water upstream of the baffle. A means is provided for intermittently raising the liquid level in the container above the static water level. A port in the container upstream of the baffle is at an elevation such that oil/grease floating on water in the container upstream of the baffle can flow from the container out through the port when the liquid level in the container is raised above the static water level.

Typically, the means for raising the liquid level is operably associated with the drain connection. For example, the means for raising the liquid level can be a weir having a pierced portion associated with the drain connection, so that low volume flows pass through the pierced portion of the weir and high volume flows raise the liquid level until liquid flows over the weir. The piercing may take the form of a weep slot or a hole.

In another embodiment, the means for raising the liquid level is a valve body that normally does not occlude the drain connection, but when closed restricts flow through a lower portion of the drain connection to raise the liquid level to a height so that liquid flows over the valve body. The valve may be manually operated. The valve may have a normal open position and a closed position achieved by pressing a plunger in opposition to a spring that restores the valve to the normal open position when pressing is completed.

Preferably, the port is in a sidewall. Advantageously, when the container has two opposed sidewalls, each has a closeable fitting, and the port is adapted to be mounted to either one of the fittings, with the other fitting not being used. The port may have a valve that can be actuated to release oil/grease through the port when the liquid level in the container is above the static water level. Such a valve may be a ball valve.

In another embodiment, the port has a rotating spout that has a normal, non-discharging position and is rotatable to a discharge position. Typically, the non-discharging position locates an outlet in the spout above the liquid level that prevails in the container when the liquid level is intermittently raised by the means for intermittently raising the liquid level in the container above the static water level. In another embodiment, the port has a flexible spout that has a non-discharging position and is positionable to a discharge position. Again, the non-discharging position typically locates an outlet in the spout above the liquid level in the container when the liquid level is intermittently raised by the means for intermittently raising the liquid level in the container above the static water level.

Preferably, the housing is made of rotomolded plastic.

The invention also provides a method of removing oil/grease from kitchen effluent including locating a container indoors, connecting a kitchen drain to an inlet to the container, and connecting a sewage outlet to a drain connection of the container, the drain connection being spaced above the container's bottom and below its top to define a static water level for liquid in the container. The method proceeds by discharging effluent water containing oil/grease from the kitchen drain into the inlet, holding the effluent water containing oil/grease in the container for a period to allow oil/grease to float to the top of the contained effluent water, permitting grey water to flow from a portion of the container out through the drain connection, intermittently raising the liquid level in the container above the static water level, and while the liquid level is raised, discharging floating oil/grease from a port above the static water level.

Raising the liquid level typically takes place because of an operation at the drain connection. One way to do so is to increase a rate of effluent flow into the inlet above the rate that can pass a piercing in a weir associated with the drain connection, to raise the liquid level in the container until grey water flows over the weir.

Preferably, at about the time of the acts of connecting, the method includes selecting a convenient one of two opposed sidewalls of the container, each of which has a closeable fitting, and mounting the port to the fitting on the selected sidewall, with the other fitting not being used.

Discharging floating oil/grease may include actuating a valve in the port to release oil/grease through the port. In another embodiment discharging floating oil/grease includes rotating a spout from a normal, non-discharging position to a discharge position. In another embodiment, discharging floating oil/grease includes adjusting a flexible spout from a non-discharging position to a discharge position.

The invention can also be considered as a method of removing oil/grease from kitchen effluent including discharging effluent water containing oil/grease from a kitchen drain into an inlet to a container located in a building in which the kitchen is located, holding the effluent water containing oil/grease in the container for a period to allow oil/grease to float to the top of the contained effluent water, permitting grey water to flow from a low portion of the container out through a drain connection to a sewage outlet that defines a static water level for liquid in the container, intermittently raising the liquid level in the container above the static water level, and while the liquid level is raised, discharging floating oil/grease from the container through a port above the static water level.

Further, the invention also provides a method of installing an apparatus for removal of oil/grease from kitchen effluent including locating a container indoors, connecting a kitchen drain to an inlet to the container, connecting a sewage outlet to a drain connection of the container, the drain connection being spaced above the container's bottom and below its top to define a static water level for liquid in the container, selecting one of two opposed sidewalls of the container, each of which has a closeable fitting above the static water level, and mounting a discharge port to the fitting on the selected sidewall.

BRIEF DESCRIPTION OF THE DRAWINGS

The invention will be better understood by a reading of the Detailed Description of the Preferred Embodiments along with a review of the drawings, in which:

FIG. 3 is a schematic view of an alternate embodiment of the outlet port;

FIG. 4 is a view of the embodiment of FIG. 5 with the valve in the non-discharge position;

FIG. 5 is a schematic view of another embodiment of the outlet port;

FIG. 6 is a view of the embodiment of FIG. 6 with the outlet spout in the non-discharge position;

DESCRIPTION OF THE PREFERRED EMBODIMENTS

Figure 1:
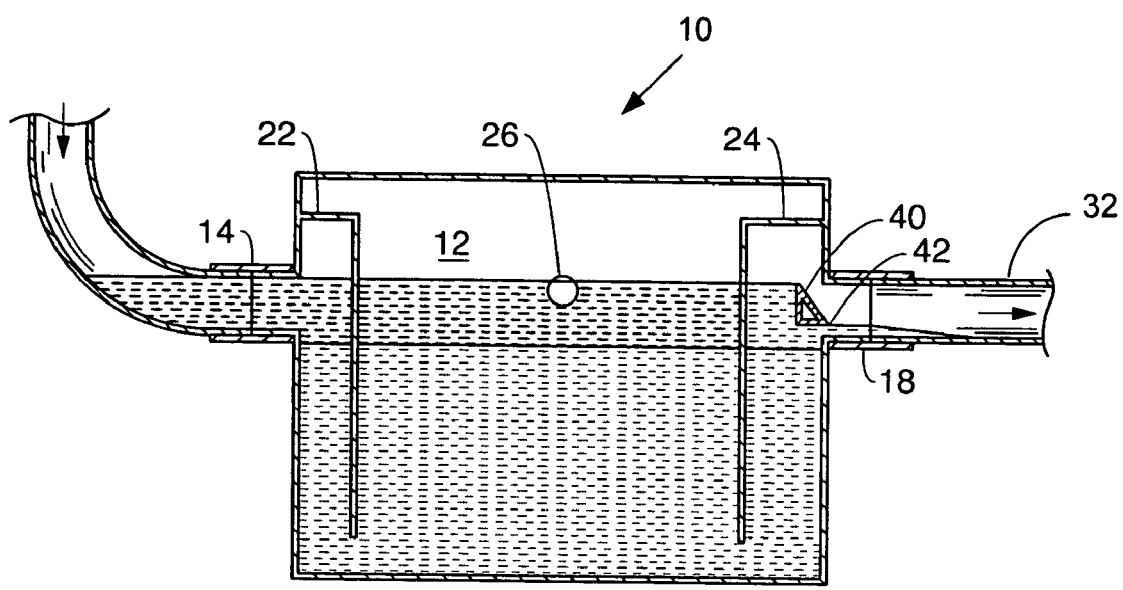
FIG. 1 is a perspective view of a first embodiment of the invention.
Figure 2:
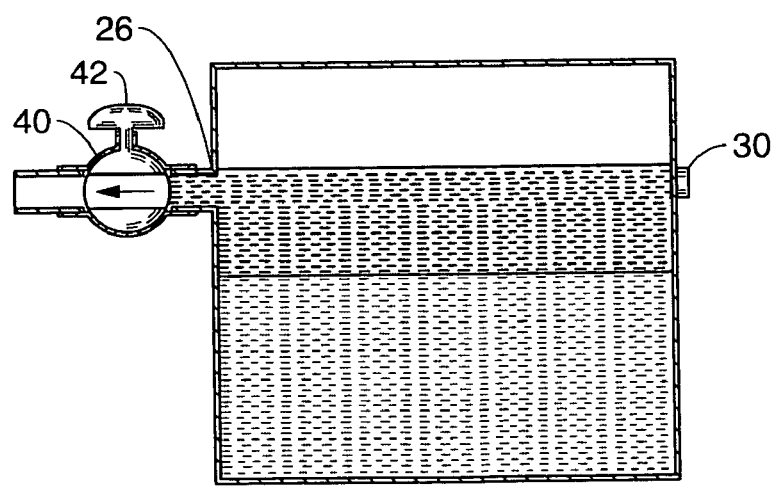
FIG. 2 is a schematic view of one form of outlet port.

As seen in FIGS. 1 and 2, an indoor grease trap 10 is provided as a container 12 having a bottom, a top, two sidewalls and, an input end and a discharge end. An inlet 14 at the input end receives effluent from a kitchen sink or similar source of effluent containing primarily water and oil/grease. The system can also be used with other sources of effluent that have a heavier and a lighter component to separate the lighter component from heavier component to be passed downstream. The container is shown as a right parallelepiped, but other suitable shapes can be used.

At the discharge end of the container is an outlet 18 connected to a sewer line 32. The outlet is located below the top and above the bottom of the container 12. As a drain, it defines the static water level in the container 12. Just upstream of the outlet 18 within the container 12 is a discharge baffle 24 which extends downwardly from at least as high as the highest expected liquid level, to a point in a lower portion of the container 12. Upstream of the outlet baffle 24 is an inlet baffle 22 of similar construction.

In one embodiment, the baffles are separately configured rotomolded plastic containers and the container 12 is a rotomolded plastic container. The molded baffles 24 and 22 can be welded in place in the container 12 to make the completed set of baffles.

Preferably, the container 12 is provided with fittings 26 and 30 on opposite sidewalls, respectively. In the embodiment shown in FIG. 1, the fitting 26 has been provided with an outlet, while the other fitting remains unused.

By providing fittings on both sides, the container 12 can be equipped to allow the installation of the apparatus regardless of whether flow is to be from the right to left or from the left to the right, assuming one sidewall of the container will be positioned against a wall or other inaccessible location. The bottom of the outlet 18 defines a static water level in the container 12 and the fittings are at identical heights, above the static water level height.

In the view of FIG. 2, one can see the apparatus of plunger 20. This includes a valve body 34 mounted on a stem 35 terminating in a plunger handle 38. The plunger 38 is held in the normally open position seen in FIG. 2 by a compression spring 36. When the plunger 38 is depressed, it drives the stem 35 and the attached valve body 34 downwardly as seen in FIG. 1. With the plunger 38 depressed, influent from the sink through the inlet 18 raises the liquid level above the static water level. Grease that has floated to the top of the water is exposed to the height of the fittings 26 and 30. The fitting 26 equipped with the outlet 28 permits the oil/grease to flow outward and be removed from the container 12, typically to a separate container (not shown) for disposal or recycling. When the oil/grease is depleted, the plunger 38 is released, permitting the liquid level to resume the static water level dictated by the bottom of the sewer connection 32.

A means of raising the liquid level is seen in FIG. 1. The liquid level varies between high and low levels by virtue of a pierced weir 40 extending across the outlet 18. In the embodiment shown in FIG. 1, a hole 42 in the lower portion of the weir allows low flows to pass downstream. To drain the oil/grease from this embodiment, a flow is discharged into the container through the inlet 14 at a higher rate than can pass the hole 42, causing the liquid level to rise to the height of the weir 40 at which point the grey water discharges readily over the weir 40 and maintains the new liquid level at the level for drainage through the grease discharge port 26.

In operation, the indoor grease trap of FIG. 1 receives an effluent flow from the attached sink. The sink may have a low flow rate, depending on the nature of the use to which it is put. However, in a typical kitchen sink, especially for commercial kitchens, a sink full of water used to wash dishes is typically drained at one time, one or more times a day, causing a large flow of water and accompanying oil/grease and solids. The fluid mixture comprising a heavier liquid and a lighter liquid flows into the container 12, where the flow passes under baffle 22 to the volume having the discharge port. There, the lighter liquid rises to the top of the fluid column by gravity. During low flows heavier water passes under the baffle 24 and hydrostatic pressure causes it to flow out of the outlet 18. During periods of high flow the combined height of the water and oil/grease fluids rises because the inflow rate exceeds the rate of drainage through the piercing 42 in the weir 40. The oil/grease, which is at the top of the fluid mixture, continues to rise until it flows out of the port, into the oil storage vessel.

The system has been described in connection with intermittent high flow rates from sinks, such as kitchen sinks, but the invention also works well in other installations that generate intermittent large volume flows.

The piercing, whether it be a hole or a slot, discharges water from the effluent separation chamber during high and low fluid flow rates. During relatively low flow rates, the weep slot or hole permits low flow without significantly raising the water level in the container. The fluid level in the container drops to a level just below the weep slot or hole, and this fluid level represents the static fluid level of the inner tank. The fluid levels within the inner tank remain substantially at the static level until the start of each large flow, such as a sink drainage cycle.

Various means for intermittently raising the liquid level can be substituted from those specifically described above. For example, an inflatable bladder can be installed in the bottom of the discharge port. The bladder may be filled to occlude the lower portion of the discharge port when desired to raise the liquid level. Alternatively, an electromagnetic means such as a solenoid can raise a weir when desired. Those of ordinary skill in the art will appreciate the numerous ways to intermittently raise the liquid level can be substituted, and those are deemed to be within the scope of the invention.

Various options for the port configuration are shown in FIGS. 2 through 7.

FIG. 2 shows an alternate embodiment of the discharge port with a ball valve 40 connected to the fitting 26. The ball valve 40 can be open and closed by rotating the handle 42.

FIG. 3 shows an alternate embodiment of the discharge port having a rotatable fitting 44 with a discharge spout 46. When the spout 46 is in the lower position shown in FIG. 5, grease can flow out. When it is in the position shown in FIG. 4, the opening of the top of the spout 46 is above the liquid level intermittently obtained.

FIG. 5 shows another embodiment of the discharge outlet in the form of a spout 50 having a corrugated portion 48. In the view shown in FIG. 5, the spout 50 is bent downwardly for discharge. In the view shown in FIG. 6 it is bent upwardly to a position above the highest expected liquid level.

Figure 7:
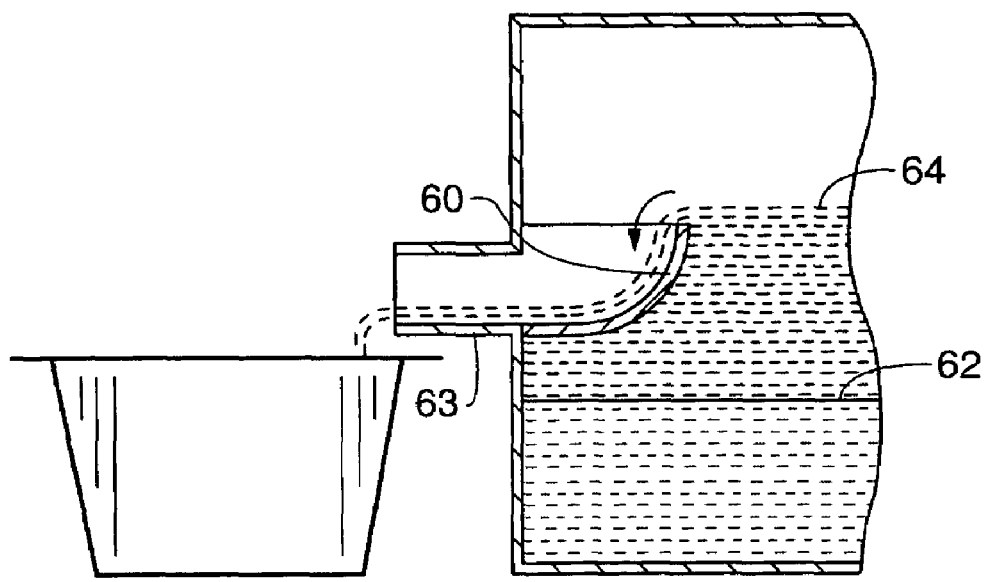
FIG. 7 is a schematic view of another outlet port arrangement.

As seen in FIG. 7, using a weir 60 will allow the grease to be easily removed without significant amounts of water being mixed with the grease. The raising of the liquid level raises both the top of the water 62 and the top of the oil/grease level 64. The oil/grease spills over the weir 60 to the discharge spout 63. As soon as water is noticed, the valve or other means raising the static water level would be released, stopping the flow of grease to water. A ball valve, rotating spout or flexible spout could be used on the outlet. If desired no spout (except for the fixed outlet) would be required.

Figure 8:
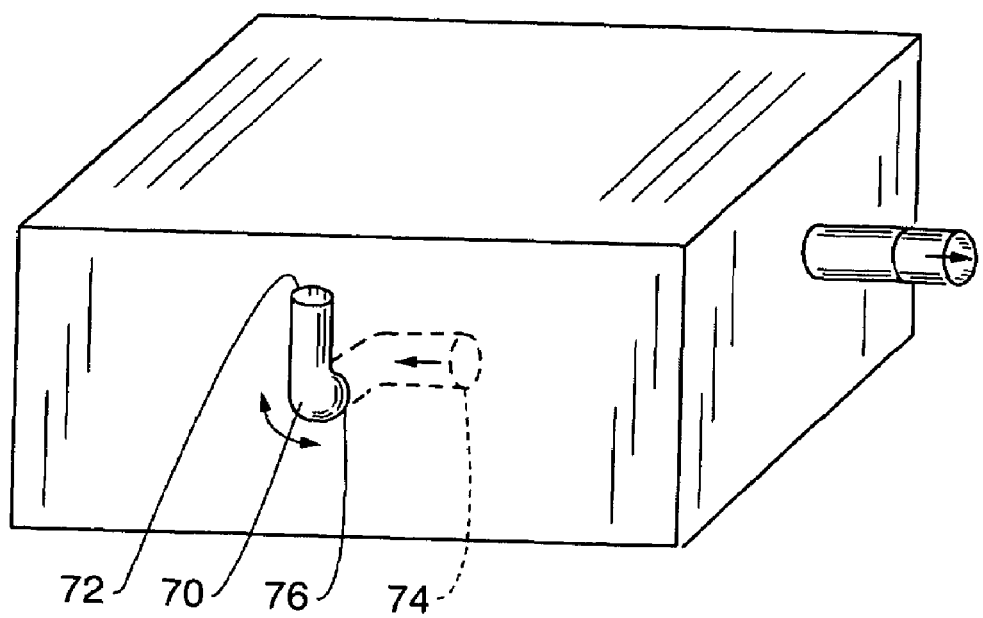
FIG. 8 is a schematic view of yet another outlet port arrangement.

The embodiment of FIG. 8 uses a spout 70 with two 90° bends. This allows the spout to create its own weir when the spout is rotated 90° to dispense grease. The spout 70 has an outlet end 72 and an inlet end 74. Each of the inlet and outlet can be the transverse opening on a respective pipe section formed at 90° to a transport pipe section 76 pivotally mounted in the container sidewall. As seen in FIG. 8, the outlet end 72 is above the section 76, which is about on the same plane as the inlet 74. The liquid does not flow up and out of the outlet 72 in this position because even the elevated water level is below the outlet 72. However, pivoting the spout 70 counter-clockwise from the position shown by 90° to 180° lowers the outlet 72 below the elevated water level and raises the inlet end 74 to be above the static water level and below the top of the oil/grease when elevated. If desired, a stop can be located to prevent clockwise rotation of spout 70 past the position shown in FIG. 8. Of course, the sense of the spout directions can be reversed.

In another embodiment, not shown, the container includes a valve that is a manually operated. The valve permits the drainage of the container to an external container. The valve takes the form of an L-shaped tube with the longer portion of the L outside the tank. The shorter leg extends into the tank through seals in which the shorter leg can rotate. And, the shorter leg preferably extends into the tank at about a 45° angle to the primary front plane of the tank. This angle causes the longer leg to move away from the plane as it is rotated down, to drain into an external container. When the leg is turned down, the grease can flow out of the shorter leg through the longer leg into the external container and continue until the longer leg is turned back up, or the oil/grease has drained down to the shorter leg's height on the plane.

A heater may be located in the container to maintain the oil and grease in a liquid form. The heater may be manually turned on or controlled with sensors which provide information to a control device which turns the heater on at preset times or as conditions warrant.

Rotomolding is the preferred fabrication method for the several components because of its low cost. Other forms of fabrication may be used.

Certain modifications and improvements will occur to those skilled in the art upon reading the foregoing description. It should be understood that all such modifications and improvements have been omitted for the sake of conciseness and readability, but are properly within the scope of the following claims.

What is claimed is:
1. A low cost oil/grease removal assembly comprising:
  a container having a bottom, a top, a sidewall, an input end and discharge end, an inlet at the input end adapted to receive effluent from a sink drain and a drain connection at the discharge end, the drain connection being spaced above the bottom and below the top to define a static water level for liquid in the container,
  a baffle in the container extending downwardly near the discharge end to a level below the static water level to allow water to flow below the baffle from the inlet to the drain connection but retaining oil/grease floating on the water upstream of the baffle, means for intermittently raising the liquid level in the container above the static water level, wherein the means for raising the liquid level is a weir having a pierced portion associated with the drain connection, so that low volume flows pass through the pierced portion of the weir and high volume flows raise the liquid level until liquid flows over the weir, and a port in the container upstream of the baffle at an elevation such that oil/grease floating on water in the container upstream of the baffle can flow from the container out through the port when the liquid level in the container is raised above the static water level.

2. The apparatus according to claim 1 wherein the piercing takes the from of a weep slot.

3. The apparatus according to claim 1 wherein the piercing takes the form of a hole.

4. The apparatus according to claim 1 wherein the port is in a sidewall.

5. The apparatus according to claim 1 wherein the container has two opposed sidewalls, each of which has a closeable fitting, and the port is adapted to be mounted to either one of the fittings, with the other fitting not being used.

6. The apparatus according to claim 1 wherein the port has a valve that can be actuated to release oil/grease through the port when the liquid level in the container is above the static water level.

7. The apparatus according to claim 6 wherein the valve for the port is a ball valve.

8. The apparatus according to claim 1 wherein the port has a rotating spout that has a normal, non-discharging position and is rotatable to a discharge position.

9. The apparatus as claimed in claim 8 in which the non-discharging position locates an outlet in the spout above the liquid level in the container when the liquid level is intermittently raised by the means for intermittently raising the liquid level in the container above the static water level.

10. The apparatus according to claim 1 wherein the port has a flexible spout that has a non-discharging position and is positionable to a discharge position.

11. The apparatus as claimed in claim 10 in which the non-discharging position locates an outlet in the spout above the liquid level in the container when the liquid level is intermittently raised by the means for intermittently raising the liquid level in the container above the static water level.

12. The apparatus according to claim 1, wherein the container is made of roto-molded plastic.

13. A method of removing oil/grease from kitchen effluent comprising:

locating a container indoors, connecting a kitchen drain to an inlet to the container, connecting a sewage outlet to a drain connection of the container, the drain connection being spaced above the container's bottom and below its top to define a static water level for liquid in the container, discharging effluent water containing oil/grease from the kitchen drain into the inlet, holding the effluent water containing oil/grease in the container for a period to allow oil/grease to float to the top of the contained effluent water, permitting grey water to flow from a portion of the container out through the drain connection, intermittently raising the liquid level in the container above the static water level, wherein raising the liquid level includes increasing a rate of effluent flow into the inlet above the rate that can pass a piercing in a weir associated with the drain connection, to raise the liquid level in the container until grey water flows over the weir, and while the liquid level is raised, discharging floating oil/grease from a port above the static water level.

14. The method according to claim 13 further comprising at about the time of the acts of connecting, selecting a convenient one of two opposed sidewalls of the container, each of which has a closeable fitting, and mounting the port to the fitting on the selected sidewall, with the other fitting not being used.

15. The method according to claim 13 wherein discharging floating oil/grease includes actuating a valve in the port to release oil/grease through the port.

16. The method according to claim 13 wherein discharging floating oil/grease includes rotating a spout from a normal, non-discharging position to a discharge position.

17. The method according to claim 13 wherein discharging floating oil/grease includes rotating a spout from a normal, non-discharging position having a spout outlet above the liquid level in the container when the liquid level is intermittently raised.

18. The method according to claim 13 wherein discharging floating oil/grease includes adjusting a flexible spout from a non-discharging position to a discharge position.

19. A method of removing oil/grease from kitchen effluent comprising:

discharging effluent water containing oil/grease from a kitchen drain into an inlet to a container located in a building in which the kitchen is located, holding the effluent water containing oil/grease in the container for a period to allow oil/grease to float to the top of the contained effluent water, permitting grey water to flow from a low portion of the container out through a drain connection to a sewage outlet that defines a static water level for liquid in the container, intermittently raising the liquid level in the container above the static water level, wherein raising the liquid level includes increasing a rate of effluent flow into the inlet above the rate that can pass a piercing in a weir associated with the drain connection, to raise the liquid level in the container until grey water flows over the weir, and while the liquid level is raised, discharging floating oil/grease from the container through a port above the static water level.

* * * * *

UNITED STATES PATENT AND TRADEMARK OFFICE
CERTIFICATE OF CORRECTION

| | | |
|---|---|---|
| PATENT NO. | : 7,186,346 B1 | Page 1 of 1 |
| APPLICATION NO. | : 10/766128 | |
| DATED | : March 6, 2007 | |
| INVENTOR(S) | : Batten et al. | |

It is certified that error appears in the above-identified patent and that said Letters Patent is hereby corrected as shown below:

In Column 2, Lines 21 through 30 should be deleted.

In Column 3, Line 58, "Figure 5" should be --Figure 3--

In Column 3, Line 62, the second reference to "Figure 6" should be --Figure 5--

In Column 4, Line 15, after "container" the word "is" should be --12--

In Column 4, Lines 29 and 30, after "26" the text should read --on opposite sidewalls, respectively--

In Column 4, Line 42-58 should be deleted.

Signed and Sealed this

Twelfth Day of June, 2007

JON W. DUDAS
*Director of the United States Patent and Trademark Office*